Patented Feb. 4, 1936

2,029,315

UNITED STATES PATENT OFFICE 2,029,315

TRI-FLUORO - METHYL - PHENYL - AZO - DI-AMINO PYRIDINES AND PROCESS OF MAKING THE SAME

Max Engelmann, Wilmington, Del., assignor to E. I. du Pont de Nemours & Company, Wilmington, Del., a corporation of Delaware No Drawing. Application June 1, 1934, Serial No. 728,542

3 Claims. (Cl. 260—42)

This invention relates to carbon compounds and more particularly such compounds in which a di-amino-pyridine is linked with a benzo-tri-fluoride by an azo radical. It especially appertains to products obtainable by coupling a diazotized amino-tri-fluoro-methyl benzene with a di-amino-pyridine.

The azo radical (—N=N—) is well known in organic chemistry and processes for producing azo compounds, that is, compounds having the formula: R—N=N—R', R and R' standing for the same or different carbon compound radicals, residues, nuclei or groups, are familiar to those skilled in the art and are described in the literature, for example, Textbook of Organic Chemistry by Bernthsen (translation by Sudborough) 1925. Azo compounds have many uses in the field of chemistry, a major use being the dyeing of textile fibers. Some azo compounds are useful as insecticides.

It has now been found that a new series of azo compounds having very valuable properties may be produced for example by diazotizing meta-amino-phenyl-fluoroform (meta-amino-tri-fluoro-methyl benzene, amino-benzo-tri-fluoride) probably having the formula:

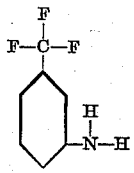

to produce the corresponding diazotized body, probably having the formula:

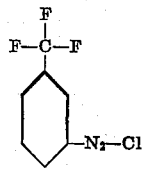

and coupling the same with alpha-alpha'-di-amino-pyridine, probably having the formula:

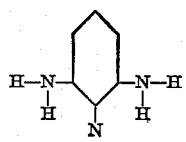

to produce a substance probably having the formula:

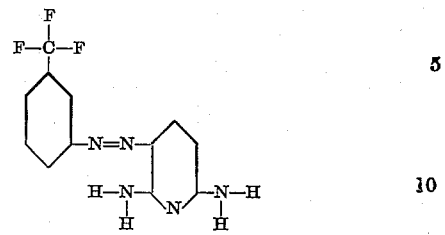

The invention will be further understood by a consideration of the detailed description and illustrative specific examples below.

This invention has for an object the preparation of new chemical compounds. Other objects are the preparation of carbon compounds in a very desirable physical form and in a high state of purity. Still further objects are to produce new azo compounds, new derivatives of amino-benzo-tri-fluorides, new derivatives of di-amino-pyridines and to devise new chemical processes. A general advance in the art and other objects which will appear hereinafter, are also contemplated.

The foregoing objects and related ends are accomplished in the manner set out in the following description in which are disclosed details of what is believed to be the best mode for carrying out the invention. The quantities are given in parts by weight throughout the application.

Example I

In 3000 parts of water 197.5 parts of meta-amino-phenyl-fluoroform hydrochloride were dissolved and 175 parts of concentrated hydrochloric acid (37–38% HCl) added. The resulting solution was cooled with ice to a temperature of about 5°–6° C. and the amine diazotized with 69 parts of sodium nitrite dissolved in 400 parts of water. This diazotization product was then poured into a cool solution containing 109.1 parts of alpha-alpha'-di-amino-pyridine and 125 parts of concentrated hydrochloric acid in 2000 parts of water. To the resulting solution there was slowly added 400 parts of a saturated solution of sodium acetate. After standing for 30 minutes the resulting mixture was heated to about 50° C. and the free acetic acid neutralized with a 20% sodium carbonate solution. The new azo compound separated in yellow needle-like crystals probably having the formula:

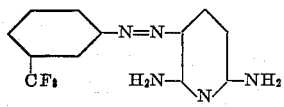

This product (meta-tri-fluoro-methyl-phenyl-azo-alpha-alpha'-di-amino-pyridine) was filtered off and dried. Thereafter it was recrystallized from xylene and found to melt at 129° C. It is insoluble in water. It is very soluble in organic solvents for example acetone, ethyl alcohol, di-ethyl ether, and benzene. It is also soluble in organic acids, for example acetic acid and lactic acid. Furthermore, it is soluble in fatty oils such as olive and palm oil and in mineral oils for example petroleum distillation fractions. With inorganic acids for example hydrochloric acid, it forms water-soluble salts, the mono-hydrochloric acid salt being orange and the di-hydrochloric acid salt being red. The mono-hydrochloric salt melts at 257° C. with decomposition. The product dyes cellulose acetate in orange shades.

The proportions and temperatures given above are not critical and the coupling may be carried out in other ways than that specifically described in Example I as will be apparent to those skilled in the art, for instance, the coupling may be carried out in alkaline or practically neutral solutions for example in the presence of carbonates or bicarbonates.

Since the new azo compounds have amino groups they readily form acid salts for example the hydrobromide, the sulfate, the nitrate and the phosphate. The salts are water soluble.

The invention is not limited to the specific reactants described above. Specific mention may be made of amino-phenyl-fluoroforms in which additional substituent radicals for example methoxy, tri-fluor-methyl, chloro and the like are present.

Special mention may be made of 1-amino-3-tri-fluoro-methyl-4-methoxy-benzene, 1-amino-3-tri-fluoro-methyl-4-chloro-benzene, 1-amino-3,5-di-(tri-fluoro-methyl)-benzene and 1-amino-2,5-di-(tri-fluoro-methyl)-benzene. Ortho and para amino-phenyl-fluoroforms may be treated similarly. Additional substituents may be on the di-amino-pyridine nucleus also. The best results have been obtained with the alpha-alpha'-di-amino-pyridines.

These new azo bodies are of a basic character and can, therefore, be applied to acidic fibers in the usual and well known ways. In particular they are dyes for cellulose acetate (Acele, Celanese) and other cellulose esters and ethers. They impart color to gasoline and such acid fibers as wool, silk (natural and weighted) and leather. Furthermore, these products have wetting-out and antiseptic properties. They have particular value as urinary antiseptics.

The invention has numerous advantages as will be apparent to workers in the field of organic chemistry. New and important colored compounds, coloring matters and intermediates are by this invention made available.

As many apparently widely different embodiments of this invention may be made without departing from the spirit and scope thereof, it is to be understood that I do not limit myself to the specific embodiments thereof except as defined in the appended claims.

I claim:
1. The process which comprises diazotizing an amino-phenyl-fluoroform and coupling the same with a di-amino-pyridine.
2. The azo compounds obtainable by diazotizing meta-amino-tri-fluoro-methyl-benzene and coupling the same with an alpha-alpha'-di-amino-pyridine and which compounds have the formula:

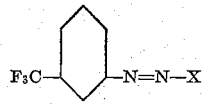

in which X represents an alpha-alpha'-di-amino-pyridine.
3. The compound having the formula

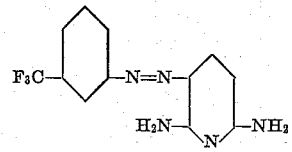

which is yellow, melts at 129° C., is very soluble in acetone, ethyl alcohol, di-ethyl-ether, benzene, vegetable oils, mineral oils and organic acids, which gives mono-dihydrochloric acid salts which are orange, which gives dihydrochloric acid salts which are red and which dyes cellulose acetate in orange shades.

MAX ENGELMANN.